United States Patent [19]

Hammonds

[11] 4,375,894

[45] Mar. 8, 1983

[54] HITCH HEAD HAVING JAWS AND LOCK BLOCK WITH COOPERATING TAPERED SURFACES

[75] Inventor: James C. Hammonds, St. Charles, Mo.

[73] Assignee: ACF Industries, Incorporated, New York, N.Y.

[21] Appl. No.: 158,961

[22] Filed: Jun. 12, 1980

[51] Int. Cl.[3] .................. B62D 53/08; B62D 53/10; B62D 53/12

[52] U.S. Cl. .................. 280/433; 280/435; 410/64

[58] Field of Search .................. 280/433, 434, 435, 436; 410/64

[56] References Cited

U.S. PATENT DOCUMENTS

| | | | |
|---|---|---|---|
| 1,479,796 | 1/1924 | Endebrock | 280/435 |
| 2,676,034 | 4/1954 | Tracey | 280/508 |
| 3,346,223 | 10/1967 | Broling | 410/64 X |
| 3,358,954 | 12/1967 | Smith et al. | 410/64 X |
| 3,632,145 | 1/1972 | Davis et al. | 280/435 X |
| 3,870,342 | 3/1975 | Baxter et al. | 280/433 |
| 4,213,590 | 7/1980 | Van Dyke | 410/64 |
| 4,221,397 | 9/1980 | Holt | 280/436 |
| 4,333,666 | 6/1982 | Hammonds | 280/435 |

*Primary Examiner*—Joseph Paul Brust
*Attorney, Agent, or Firm*—Henry W. Cummings

[57] ABSTRACT

A hitch head or fifth wheel is provided including a pair of pivotable jaws which in closed position hold in place a kingpin of a highway trailer. A horizontally movable lock block engages the rear portion of the jaws and holds the jaws in closed position. The lock block is movable to a position out of engagement with the jaws to allow escape of the kingpin. The rear surfaces of the jaws and the side surface of the lock block are provided with cooperating tapers which reduce frictional drag when the lock block is moved to open position, and when it returns to locked position, compensate for manufacturing tolerances which tend to create misalignment between the lock block and the rear portion of the jaws, compensate for wear in the engaging surfaces of the jaws and lock block, and provide a tight fit without undue clearance when the lock block engages the jaws.

9 Claims, 7 Drawing Figures

HITCH HEAD HAVING JAWS AND LOCK BLOCK WITH COOPERATING TAPERED SURFACES

BACKGROUND OF THE INVENTION

In U.S. Pat. No. 4,213,590 assigned to the same assignee as the present application, a hitch head or fifth wheel is provided including a pair of pivotable jaws which hold in place a kingpin of a highway trailer. A horizontally movable lock block, having straight sides, biased by a stiff spring to closed position, engages the jaws, also having straight sides, and holds them in closed position, maintaining the kingpin in place. The lock block is movable to an open position by a finger extending through an opening in the lock block. The finger is rigidly attached to a horizontally extending operating shaft which is rotatable by a handle to move the finger to an overcenter position holding the lock block in open position. The finger includes a transversely extending protrusion which is engaged by the jaws as the kingpin exits to pivot the finger from the overcenter position and allow the lock block to move to a position engaging the rear portion of the jaws, holding the jaws open until another kingpin enters the jaws and pivots the jaws to closed position.

However, in this construction, because of the straight sides, the tolerances inherent in commercially manufacturing the jaws, lock block, spring and spring shaft sometimes cause an improper engagement or seating of the lock block upon the rear surfaces of the jaws, or excessive clearance between the lock block and jaws, allowing the jaws some free movement with the kingpin in place.

Furthermore, because of the straight sides, there is some tendency in the above construction for the rear portion of the jaws to provide a frictional drag on the lock block when the lock block is moved from the engaged position with the rear portion of the jaws to the disengaged position, and from the disengaged to the engaged position.

Also the straight sides do not provide a means to accommodate wear in the engaging portions of the lock block and the jaws.

SUMMARY OF THE INVENTION

A hitch head or fifth wheel is provided including a pair of pivotable jaws which in closed position hold in place a kingpin of a highway trailer. A horizontally movable lock block engages the rear portion of the jaws and holds the jaws in closed position. The lock block is movable to a position out of engagement with the jaws to allow escape of the kingpin. The rear surfaces of the jaws and the side surfaces of the lock block are provided with cooperating tapers which reduce frictional drag when the lock block is moved to open position, and when it returns to locked position, compensate for manufacturing tolerances which tend to create misalignment between the lock block and the rear portion of the jaws, compensate for wear in the engaging surfaces of the jaws and lock block, and provide a tight fit without undue clearance when the lock block engages the jaws.

THE DRAWINGS

Figure 1:
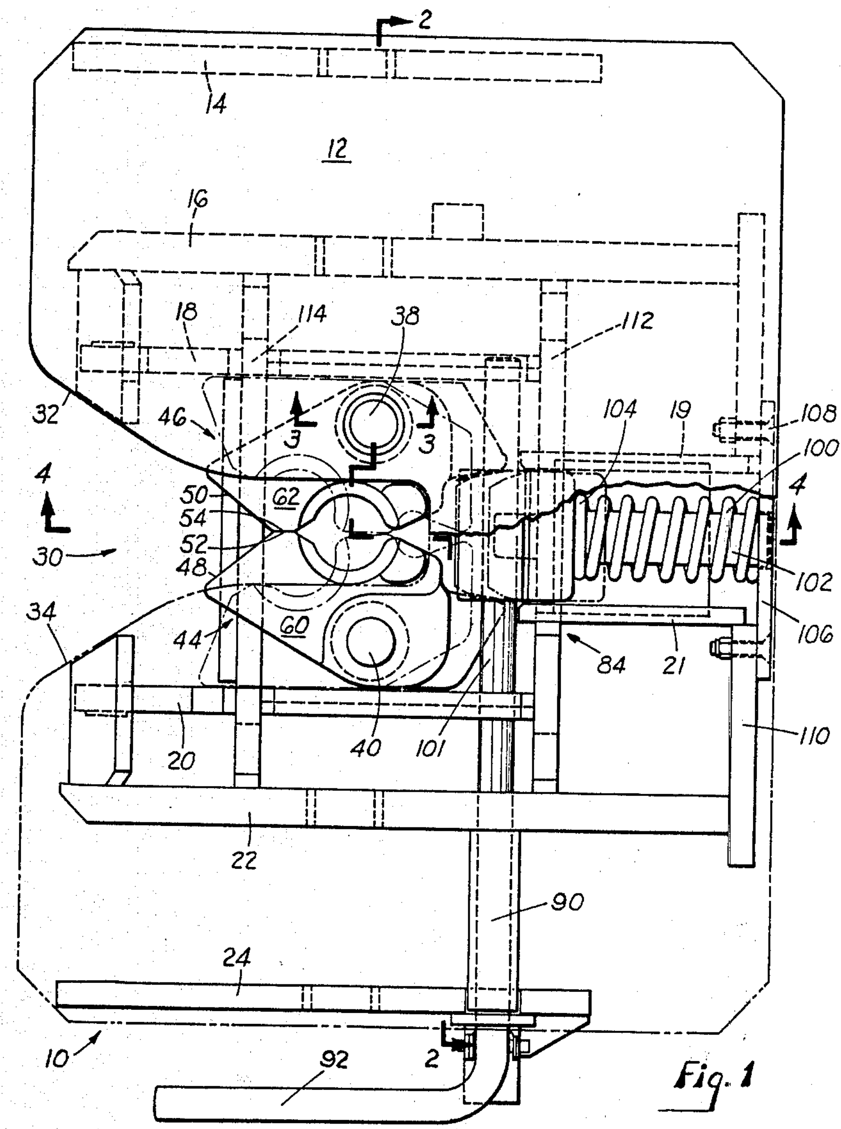
FIG. 1 is a plan view of the jaw interlock arrangement of the present invention.
Figure 1A:
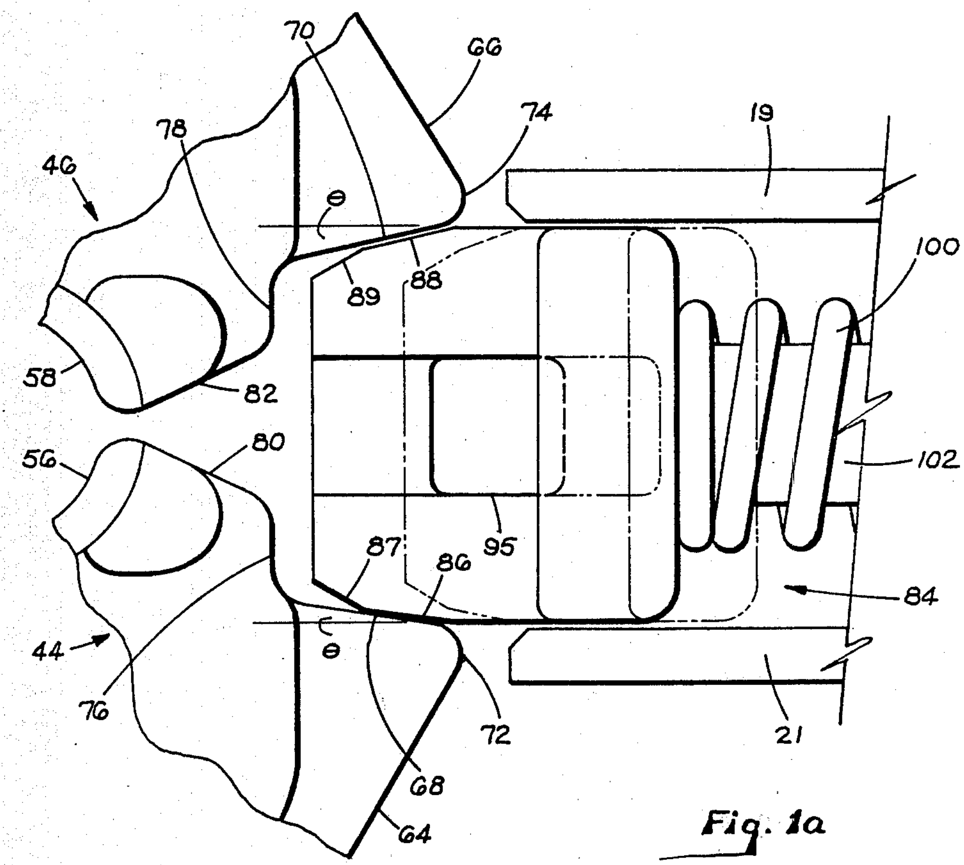
Figure 2:
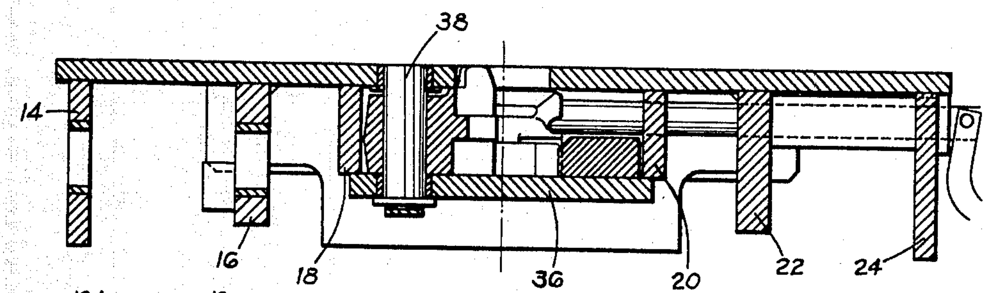
FIG. 2 is an end elevation view looking in the direction of the arrows 2—2 in FIG. 1.
Figure 3:
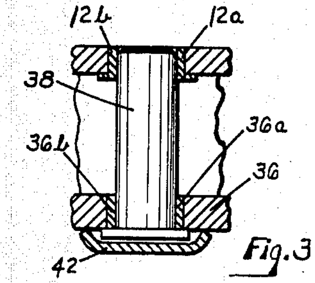
FIG. 3 is a vertical sectional view looking in the direction of the arrows 3—3 in FIG. 1 illustrating the jaw pins.

FIG. 1*a* is an enlarged plan view of the jaws and lock block with the top plate removed, illustrating the tapered surfaces of the invention.

DESCRIPTION OF PREFERRED EMBODIMENTS

Figure 4:
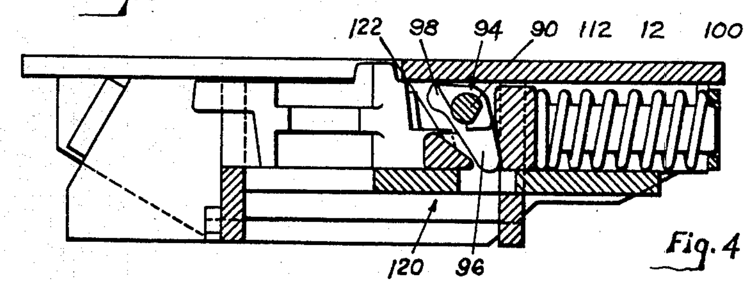
FIG. 4 is a sectional view looking in the direction of the arrows 4—4 in FIG. 1.

In the hitch head or fifth wheel 10, a longitudinally extending top plate 12 includes a plurality of depending webs 14,16,18,19,20,22,21 and 24. Top plate 12 includes an opening 30 defined by a pair of inclined gathering surfaces 32 and 34 adapted to guide the kingpin of a highway trailer into engaged position with the hitch head. A bottom plate 36 is located inwardly of the gathering surfaces 32 and 34, and a pair of jaw pins 38 and 40 are mounted in openings 12*a* and 36*a* as indicated in FIG. 4. Suitable bushings 12*b* and 36*b* are also provided for the jaw pins, and a lower retaining plate 42 is also provided for each of the jaw pins.

Jaws 44 and 46 are rotably mounted about the jaw pins 38 and 40. Each of the jaws 44 and 46 include front tapered surfaces 48 and 50, abutting portions 52 and 54, and arcuate kingpin engagement portions 56 and 58. The jaws further include body portions 60 and 62 surrounding jaw pins 38 and 40 and first rear tapered surfaces 64 and 66. Each of the jaws include inwardly extending second tapered surfaces 68 and 70 and lugs 72 and 74 are defined at the juncture of tapered surfaces 66 and 70 and 64 and 68. The jaws further include transverse vertical surfaces 76 and 78 and inclined vertical surfaces 80 and 82 which join arcuate jaw portions 56 and 58.

Figure 5:
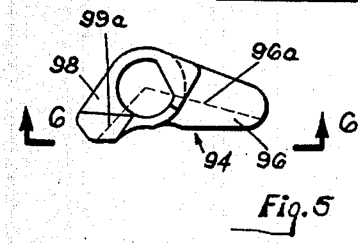
FIG. 5 is a detail view of the finger utilized in the jaw interlock arrangement.

A lock block 84 is generally rectangular, however, it includes side vertical tapered surfaces 86 and 88 which cooperate with tapered surfaces 68 and 70 on the jaws. Side tapered surfaces include tapered portions 87 and 89 which are tapered away from surfaces 68 and 70 on the jaws. A shaft 90 extends transversely of the hitch through vertical walls 22, 24 and 20 and includes a generally longitudinally extending handle 92. As described in greater detail in U.S. Pat. No. 4,213,590, hereby incorporated into the present application by this reference, shaft 90 includes a finger 94 located in an opening 95 in the lock block and which is rigidly connected thereto. This finger is shown in FIG. 5 and includes a first downwardly extending portion 96 and a second upwardly and outwardly extending portion 98. Finger extension 96 has a center line 96*a* and extension 98 has a center line 98*a*. Center lines 96*a* and 98*a* make an angle of at least 90 degrees. Preferably the angle does not exceed 160 degrees. Rotation of shaft 90 by handle 92 is effective to move lock block 84 rearwardly against the bias of a spring 100 which surrounds a spring shaft 102 which is integral with lock block 84. Shaft 102 may be formed as a single piece with lock block 84, or may be welded thereto. Spring 100 is held in place by a rear wall 104 of lock block 84 and a spring plate 106 held in place by fasteners 108 extending into a transversely extending hitch head rear plate 110.

The cooperating tapered surfaces 68 and 70 on the jaws and 86 and 88 on the lock block reduce the tendency for the lock block to be resisted by friction between these surfaces in movement from closed to open position and from open to closed position as has been observed to occur in some instances according to the construction in U.S. Pat. No. 4,213,590. In this regard, it is preferred that the cooperating tapers 68, 70 and 86 and 88 respectively be of the same angle $\theta$, and be within the range of 2 to 6 degrees with respect to a line parallel to the center line of the lock block, ie the straight lock block sides.

Furthermore, the tapered surfaces 68, 70 and 86 and 88 tend to reduce the effect of manufacturing tolerances in the formation of the jaws 44 and 46 and in the lock block 84.

Moreover, the tapered surfaces allow for a limited amount of wear in the engaging surfaces 68 and 70 and 86 and 88 and still remain tight securement.

Finally, the cooperating tapers provide a tight fit without undue clearance when the lock block engages the jaws.

It is thus seen that the cooperating tapered surfaces 68, 70, 86 and 88 of the present invention provide an improved construction over that shown and described said U.S. Pat. No. 4,213,590.

To complete the description of the hitch head a plurality of transversely extending plates 112 and 114 are provided which are conveniently welded to longitudinally extending plates 16, 24, 18 and 22 and regarding transverse plate 112 to longitudinal plates 20 and 21.

The operation is basically similar to that in U.S. Pat. No. 4,213,590 referred to above.

Figure 6:
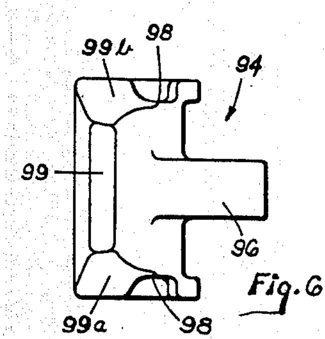
FIG. 6 is a side elevation view of the finger illustrated in FIG. 4 looking in the direction of the arrows 6—6 in FIG. 4.

Finger 94 includes a generally vertically extending extrusion or protrusion 96 (FIG. 4) which extends upwardly through opening 95 and engages lock block 84. Extension 96 moves lock block 84 rearwardly against the bias of spring 100 to the over-center position 1*a* by actuation of operating handle 92 and shaft 90. However, movement of the lock block 30 to the rearward position does not open the jaws. The jaws are opened as the kingpin engages arcuate portion of the jaws 56 and 59 during exit and pivots the jaws about pins 38 and 40. The trailer may be removed by a tractor or an overhead crane according to known conventional techniques. As the jaws open, the jaws engage second finger extension 98 located upon the finger 94. As shown in FIGS. 5 and 6 the protrusion 98 is laterally extending between the respective jaws 44 and 46. Extension 98 includes a depending cam surface 99 having end tapered portions 99*a* and 99*b*. When the jaw lugs 72 and 74 engage the protrusion 98 the finger 42 is pivoted from the over-center position shown in phantom in FIG. 1*a*, which enables the locking member 30 to move under the bias of the spring 32 into an engaged position with the rear jaw lugs 72 and 74 and surfaces 64 and 66, as shown in dotted lines in FIG. 1. The jaws then remain in this open position until another trailer kingpin enters the jaws and the arcuate portions 56 and 58 of the jaws and pivots the jaws to a closed and locked position. At the same time lock block 84 again assumes a closed, engaged position between the jaws, engaging the jaws at 68 and 70 as shown in solid lines in FIG. 1 without frictional drag.

Other modifications will be apparent to those skilled in the hitch and fifth wheel art.

What is claimed is:

1. A hitch head or fifth wheel comprising a pair of pivotable jaws adapted in closed position to hold in place a kingpin of a highway trailer; a horizontally movable lock block engaging the rear portion of the jaws and holding the jaws in closed position; said lock block being movable to a position out of engagement with the jaws to allow exit of the kingpin; each of said jaws having a tapered rear surface which receives said lock block; said lock block having a first pair of cooperating tapered surfaces which engage said jaw tapered surfaces, thereby tending to reduce frictional drag when the lock block is moved to open position and to closed position, tending to compensate for manufacturing tolerances which tend to create a loose fit with the kingpin, to avoid misalignment between the lock block and the engaging surfaces of said jaws, and tending to compensate for wear in the engaging surfaces of the jaws and lock block; and a second pair of tapered surfaces making a greater angle than said first tapered surfaces and extending to the inner edge of said lock block which allows said jaws to clear said lock block as the jaws move between open and closed positions.

2. A hitch head or fifth wheel according to claim 1 including a stiff spring biasing said lock block into engagement with said jaws.

3. A hitch head or fifth wheel according to claim 2 wherein said lock block includes an opening and wherein a finger extends within said opening to move said lock block between engaged and disengaged positions with said jaws.

4. A hitch head or fifth wheel according to claim 3 wherein said finger is rigidly attached to a horizontally extending operating shaft.

5. A hitch head or fifth wheel according to claim 1 when said cooperating tapered surfaces make equal angles with a line parallel to the center line of the lock block.

6. A hitch head or fifth wheel according to claim 5 when said angle is from two (2) to six (6) degrees.

7. In a hitch head comprising a pair of pivotable jaws adapted to hold in place a kingpin of a highway trailer; a horizontally movable lock block biased by a resilient means to closed position, engaging the jaws and holding them in closed position, and adapted to maintain a kingpin of a highway trailer in place; said lock block being movable to an open position by a finger extending through an opening in said lock block; said finger rigidly attached to a horizontally extending operating shaft which is rotatably mounted and adapted to move said finger to an overcenter position holding the locking block in open position; said finger including a transversely extending protrusion which is engaged by said jaws as the kingpin exits to pivot said finger from said overcenter position, and allows said lock block to move to an intermediate position engaging the rear portion of the jaws, holding the jaws in open position until another kingpin enters the jaws and pivots the jaws to said closed position, the improvement comprising: each of said jaws having a tapered rear surface which receives said lock block; said lock block having a first pair of cooperating tapered surfaces which engage said jaw tapered surfaces thereby tending to reduce frictional drag when the lock block is moved to open position and to closed position, tending to compensate for manufacturing tolerances which tend to create misalignment between the lock block and the engaging surface of said jaws, avoid loose fit between the jaws and the kingpin and tending to compensate for wear in the engaging surfaces of the jaws and lock block, and a second pair of tapered surfaces making a greater angle than said first tapered surfaces and extending to the inner edge of said lock block which allows said jaws to clear said lock block as the jaws move between open and closed positions.

8. A hitch head or fifth wheel according to claim 7 when said cooperating tapered surfaces make equal angles with a line parallel to the center line of the lock block.

9. A hitch head or fifth wheel according to claim 8 when said angle is from two (2) to six (6) degrees.

* * * * *